United States Patent
Araki et al.

(10) Patent No.: US 6,850,474 B2
(45) Date of Patent: Feb. 1, 2005

(54) MULTILAYER OPTICAL RECORDING MEDIUM AND RECORDING METHOD AND APPARATUS FOR THE SAME

(75) Inventors: Yoshitsugu Araki, Tsurugashima (JP); Takanori Maeda, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 443 days.

(21) Appl. No.: 09/864,082

(22) Filed: May 24, 2001

(65) Prior Publication Data

US 2002/0031075 A1 Mar. 14, 2002

(30) Foreign Application Priority Data

May 24, 2000 (JP) ........................ 2000-152272

(51) Int. Cl.$^7$ .............................. G11B 7/00; G11B 7/24
(52) U.S. Cl. .................... 369/94; 369/59.24; 369/275.2
(58) Field of Search .............................. 369/118, 59.23, 369/59.24, 94, 100, 275.2, 278, 284, 288, 13.38, 13.39, 124.02

(56) References Cited

U.S. PATENT DOCUMENTS 6,456,584 B1 * 9/2002 Nagata et al. ........... 369/275.2

FOREIGN PATENT DOCUMENTS

| EP | 0768652 A2 | 4/1997 |
|----|-----------|--------|
| EP | 0957477 A2 | 11/1999 |

OTHER PUBLICATIONS

Japanese Abstract No. 09212918, dated Aug. 15, 1997.

* cited by examiner

Primary Examiner—Thang V. Tran
(74) Attorney, Agent, or Firm—Sughrue Mion, PLLC

(57) ABSTRACT

A recording method of a multilayer recording medium includes a first initializing step of initializing a lower recording layer based on a first initializing condition and a second initializing step of initializing an upper recording layer on the basis of a second initializing condition different from the first initializing condition. The second initializing condition is determined so that a transmittance of the recording layer after execution of the second initializing step is approximately equal to a transmittance of the recording layer after a predetermined data signal is recorded on an upper recording layer.

6 Claims, 4 Drawing Sheets

MULTILAYER OPTICAL RECORDING MEDIUM AND RECORDING METHOD AND APPARATUS FOR THE SAME

BACKGROUND OF THE INVENTION

1. Field of the Invention

The present invention relates to a multilayer optical recording medium having a plurality of recording layers and a recording method and apparatus of the multilayer optical recording medium.

2. Description of the Related Art

In recent years, development of a multilayer optical disc has progressed as a recording medium having a large capacity wherein a recording capacity per side can be increased. The multilayer optical disc has a structure in which a plurality of half-mirror type reflection recording layers are laminated. For example, in a 2-layer DVD (Digital Versatile Disc) having two recording layers, two recording layers are stacked with a relatively small interval. A phase change recording film is formed on each of an upper layer (i.e., a layer near an optical pickup) and a lower layer. Upon recording of the 2-layer disc, a laser beam is focused on one of the recording layers and a data signal is recorded thereon.

It is, however, necessary to change recording conditions when recording is performed on the lower layer according to whether data has been recorded on the upper layer or no data is recorded thereon. This is because an average reflectance of the upper layer increases (i.e., an average transmittance decreases) when data has been recorded on the upper layer. There is, consequently, a problem that a recording density has to be set to a value lower than that used when recording data on a single-layer disc in consideration of a reduction of a S/N ratio (signal to noise ratio) due to an influence of larger average reflectance.

The problem becomes more serious for a multilayer optical disc in which the number of recording layers is further increased in order to increase the recording density. A large difference occurs in the transmittance or the S/N ratio in dependence on whether the recording layers over the recording layer on which recording is performed are recorded layers or not. There is, thus, a problem such that the necessity of sequentially recording data from the upper layer to the lower layer is caused or so many recording layers cannot be laminated.

OBJECTS AND SUMMARY OF THE INVENTION

The present invention is made in consideration of the foregoing problems and it is an object of the present invention to provide a multilayer optical recording medium on which stable recording can be performed. It is also an object of the present invention to provide a recording method and an apparatus of the multilayer optical recording medium.

To achieve the object, according to one aspect of the present invention, there is provided a rewritable multilayer recording medium in which while a light beam is transmitted through one recording layer, the light beam is irradiated to another recording layer, thereby recording a data signal, wherein a dummy signal is recorded on the one recording layer prior to recording of the data signal on the another recording layer.

According to another aspect of the present invention, there is provided a recording apparatus of a rewritable multilayer recording medium in which while a light beam is transmitted through one recording layer, the light beam is irradiated to another recording layer, thereby recording a data signal, which comprises a recording unit for recording a dummy signal on the one recording layer prior to recording of the data signal on the another recording layer.

According to another aspect of the present invention, there is provided a recording method of a rewritable multilayer recording medium, in which while a light beam is transmitted through one recording layer, the light beam is irradiated to another recording layer, thereby recording a data signal, which comprises: a first initializing step of initializing the another recording layer on the basis of a first initializing condition; and a second initializing step of initializing the one recording layer on the basis of a second initializing condition different from the first initializing condition, wherein the second initializing condition is determined so that a transmittance of the recording layer after execution of the second initializing step is approximately equal to a transmittance of the recording layer after a predetermined data signal is recorded on the one recording layer.

According to another aspect of the present invention, the frequency f of the dummy signal satisfies $$f \geq v \times n / (2 \times NA \times d)$$

where, d (mm): interval between the one recording layer and the another recording layer NA: numerical aperture of an objective lens for converging the light beam n: refractive index of a medium between the one recording layer and the another recording layer v (mm/sec): line velocity of the multilayer recording medium when recording the dummy signal.

DETAILED DESCRIPTION OF THE PREFERRED EMBODIMENTS

Embodiments of the present invention will be described in detail with reference to the drawings.

First Embodiment

Figure 1:
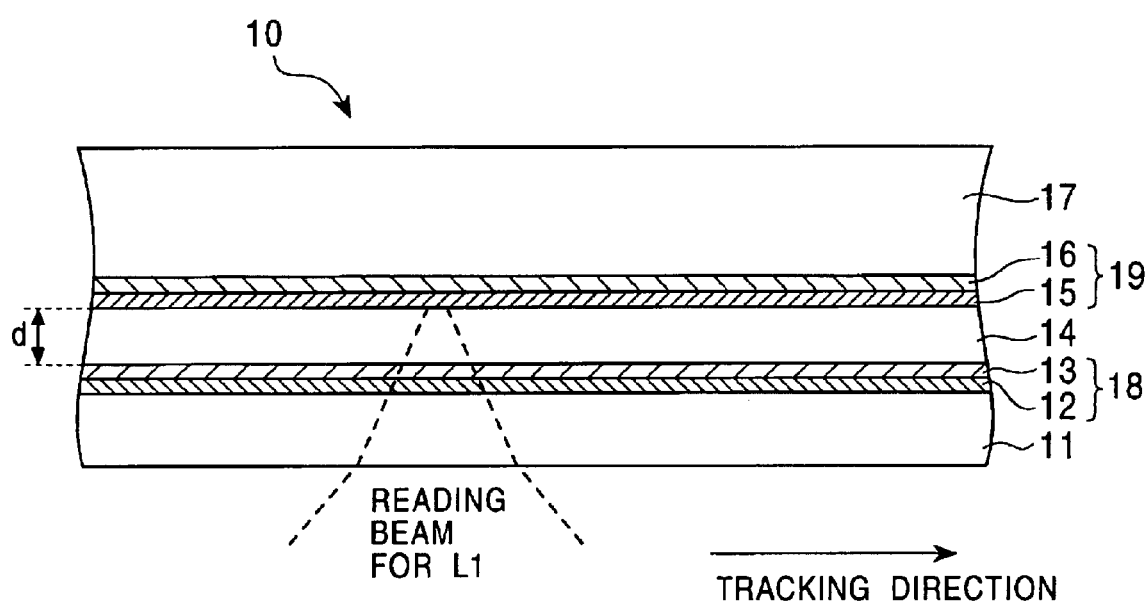
FIG. 1 is a cross sectional view schematically showing a structure of a 2-layer recording disc along the tracking direction according to the present invention.

FIG. 1 is a cross sectional view in the tracking or tracing direction schematically showing a structure of a 2-layer recording disc according to the present invention. A 2-layer recording disc 10 is sequentially constructed by a cover layer 11, a phase change recording film 12 of an upper layer, a guide groove 13 constructing an information recording track of the upper layer, a spacer layer 14, a phase change recording film 15 of a lower layer, a guide groove 16 of the lower layer, and a disc substrate 17 in order from the irradiating side of a light beam for recording or reproducing information data.

A material having a high optical transmittance in a wavelength band of the irradiation light is used for the cover layer 11 and spacer layer 14, for example, an ultraviolet hardening resin material or the like, since the irradiation light passes through the layers 11, 14. Germanium antimonytellurium (GeSbTe) or the like is used as a material of the phase change recording films 12 and 15. A material such as polycarbonate or the like is used for the disc substrate.

The phase change recording films 12 and 15 are in an amorphous state where the reflectance is low and transmittance is high when the films are formed. The temperature of a portion where a laser beam is irradiated rises when recording is performed by irradiating the laser beam from an optical pickup. After the temperature exceeds a crystallization temperature, the laser beam irradiated portion is cooled, so that the portion changes into a crystal state where the reflectance is high and transmittance is low. Among the materials for the film, there is a material such that recording cannot be performed unless the material is initialized into a stable amorphous state by irradiation of light, or there is also a material on which recording can be performed without the initialization, i.e., on the material as it is formed. Any of those materials, however, can be used. A description will be made wherein the material on which recording can be performed without the initialization is used for the phase change recording film.

In the following description, an upper recording layer 18 (i.e., the first layer when it is seen from the irradiating side of the light beam) including the phase change recording film 12 and guide groove 13 is referred to as a layer-0 (L0), and a lower recording layer 19 (i.e., the second layer) including the phase change recording film 15 and guide groove 16 is referred to as a layer-1 (L1). By moving the focal position of the irradiated light beam in the depth direction, an information data signal can be recorded to any one of the recording layers of the layer-0 (L0) 18 and the layer-1 (L1) 19 and the information data signal can be reproduced from any one of the recording layers.

Figure 2:
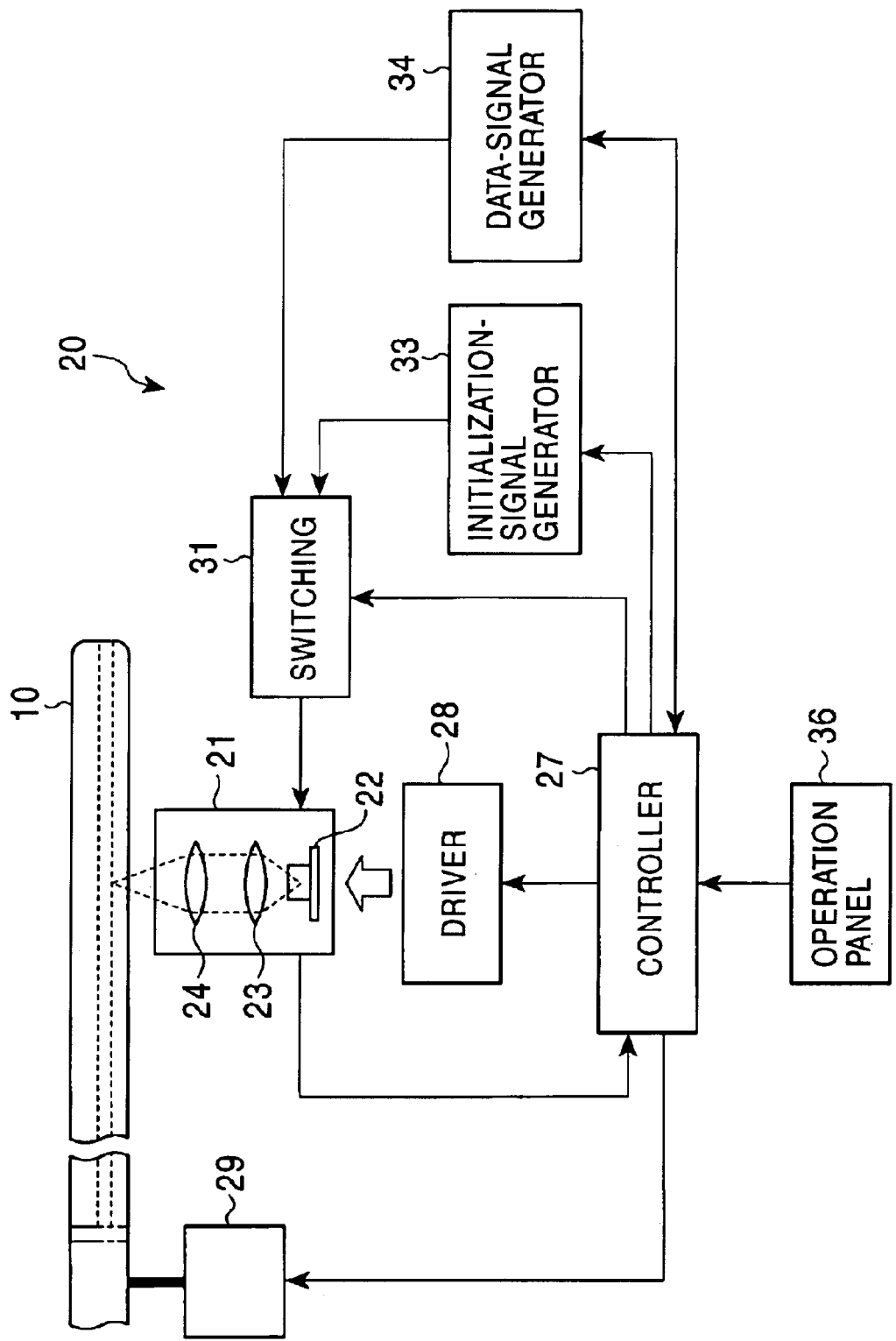
FIG. 2 is a block diagram showing a configuration of a recording apparatus of a multilayer optical disc according to the present invention.

FIG. 2 is a block diagram showing a configuration of a recording apparatus 20 of a multilayer optical disc according to the present invention. The data signal is recorded on the optical disc 10 having the phase change recording films of two layers by an irradiation laser beam emitted from an optical pickup 21.

The optical pickup 21 includes: a light source 22 for emitting a laser beam; a collimator lens 23 for converting the emitted laser beam into a parallel laser beam; and an objective lens 24 for converging the collimated laser beam. A tracking position and an irradiation laser beam focal position of the optical pickup 21 are changed in accordance with a driving signal from a driver 28 which operates on the basis of a control signal from a controller 27. The optical disc 10 is rotated by a spindle motor 29. The spindle motor 29 operates on the basis of a control signal from the controller 27.

The optical pickup 21 is further connected to an initialization-signal generating circuit 33 and a data-signal generating circuit 34 via a switching circuit 31. The controller 27 controls the switching circuit 31 on the basis of an input control signal from an operation panel 36 operated by a user or a read signal from a photodetector (not shown) in the optical pickup 21, for example, TOC (Table of Contents) information or the like, thereby selectively supplying one of an initialization signal and a data signal, which will be explained hereinlater, to the optical pickup 21. As mentioned above, the controller 27 simultaneously controls the driver 28, thereby allowing the selected signal to be recorded on one of the recording layers of the optical disc 10.

The data-signal generating circuit 34 converts each of various digital data such as image, audio data, information data, and the like into a signal of a predetermined format adapted to the recording of the optical disc 10, thereby generating a recording data signal (hereinafter, simply referred to as a data signal). The data-signal generating circuit 34 may also be connected to a signal processing circuit for generating the various digital data, a receiving circuit, a storing circuit (not shown) in which various digital data has been stored, and the like and may convert the digital data supplied from the circuits into recording data signals.

The initialization-signal generating circuit 33 generates the initialization signal which is recorded into a recording layer of the optical disc 10 in order to initialize the recording layer. As an initialization signal, a non-modulation or unmodulated signal of a predetermined current value or a dummy signal can be used. A process for initializing the optical disc 10 will now be described hereinbelow.

Figure 3:
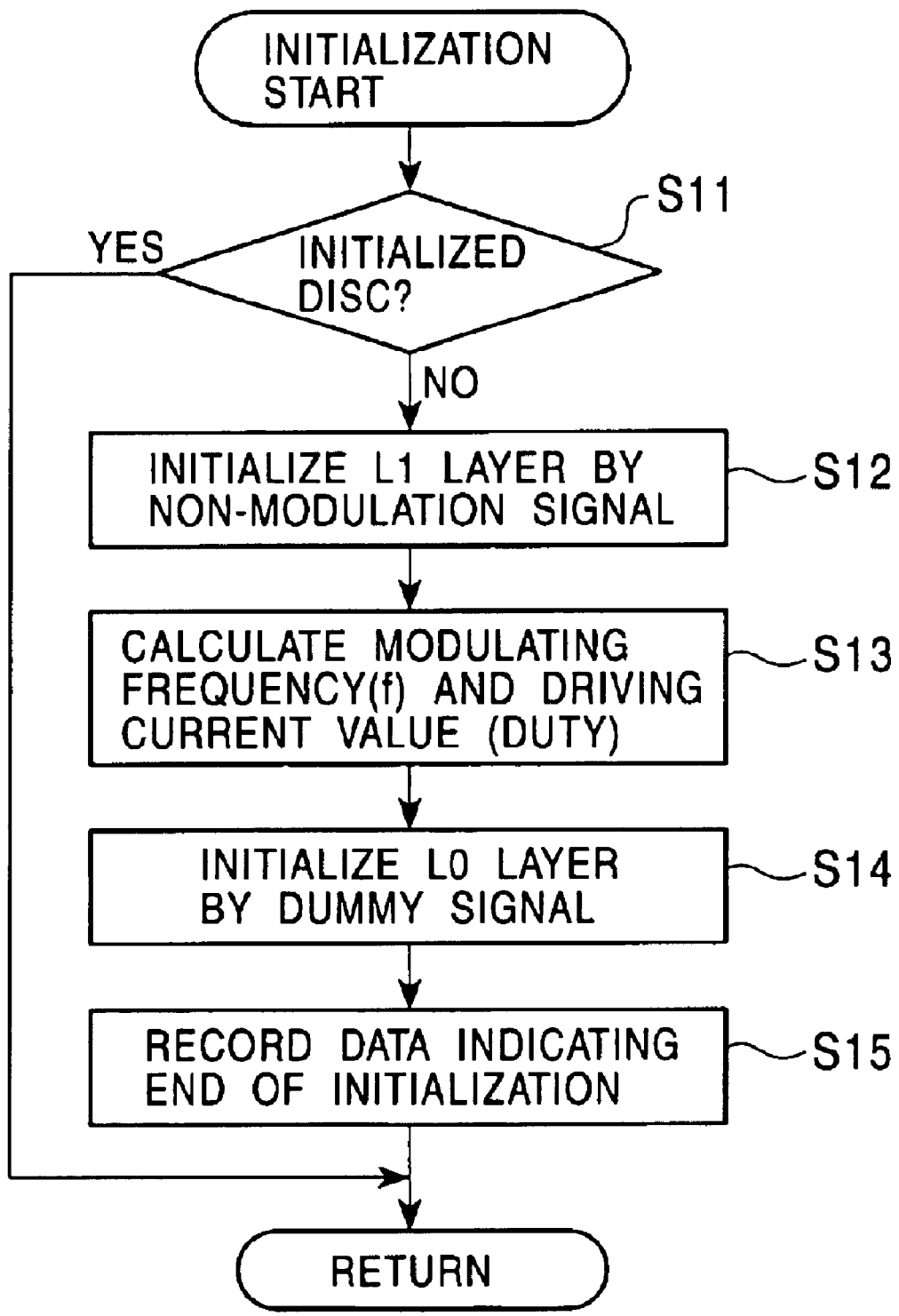
FIG. 3 is a flowchart showing a procedure for initializing a 2-layer optical disc according to the first embodiment of the present invention.

FIG. 3 is a flowchart showing a procedure for initializing the optical disc 10 which is performed by the controller 27. It is determined whether a loaded optical disc 10 is an initialized disc or not (step S11). This determination can be made, for example, on the basis of data (or a flag or the like) recorded in a data region which is provided in a lead-in area of the optical disc 10 and indicates whether the disc has been initialized or not, or can be made on the basis of a signal inputted by the user operation of the operation panel 36.

If it is determined that the optical disc 10 is not initialized, the controller 27 allows the non-modulation signal from the initialization-signal generating circuit 33 to be supplied to the optical pickup 21 and drives the laser light source 22 with the predetermined current, thereby initializes the layer-1 (L1) 19 of the optical disc 10 (step S12). The initializing method is generally similar to that of the recording layer used hitherto. If it is determined in step S11 that the disc has been initialized, control exit the routine to return to the main routine.

Subsequently, the layer-1 (L0) 18 is initialized. In this instance, the controller 27 calculates a modulation frequency (f) of the dummy signal and a driving current value (or a duty ratio) of the laser light source 22 (step S13) in order to initialize the layer-0 (L0) 18. The modulation frequency (f) of the dummy signal is determined such that more than one period of the signal is included within the beam diameter on the layer-0 (L0) 18 when the laser beam is focused on the layer-1 (L1) 19 while transmitting through the layer-0 (L0) 18. The objective lens 24 is set to have a predetermined numerical aperture for recording or reproduction. More specifically, the modulation frequency (f) is set as follows:

$$f \geq v \times n/(2 \times NA \times d) \quad (1)$$

where, d (mm): interval between the layer-0 (L0) 18 and the layer-1 (L1) 19

NA: numerical aperture of the objective lens 24 n: refractive index of a medium between the layers v (mm/sec): line velocity at the time of initialization At this time, the driving current value (or duty ratio) is selected to a value so that the light transmittance of the layer-0 (L0) 18 after the initialization is approximately or substantially equal to that after the predetermined data signal was recorded on the layer-0 (L0) 18. A data signal corresponding to a feature of the data signal to be recorded (for example, image data, audio data, information data which is used in a computer, etc.) can be used or a predetermined data signal irrespective of the feature of the data signal can be used. Although the description is made wherein the output signals of the initialization-signal generating circuit 33 and data-signal generating circuit 34 are switched by using the switching circuit 31, the present invention is not limited to the configuration. The data-signal generating circuit 34 may generate an initialization data signal as well as a recording data signal.

The modulation frequency (f) actually has an upper limit frequency (fc) which is determined by a cut-off frequency of the initialization-signal generating circuit 33 or a light density necessary for recording one pulse of the signal. More specifically, the modulation frequency (f) is also set so as to satisfy the following expression.

$$fc \geq f \quad (2)$$

The controller 27 controls the switching circuit 31 so as to supply a dummy pulse signal which has been determined by the above method from the initialization-signal generating circuit 33 to the optical pickup 21 to record the dummy pulse signal, thereby initializing the layer-0 (L0) 18 (step S14).

Subsequently, data (or flag or the like) indicating that the disc has already been initialized is recorded into a predetermined data region on the optical disc 10 (step S15). The processing routine is finished.

According to the above-mentioned processing procedure, the initialized recording layer has approximately the same transmittance as that of the recording layer on which the data signal has been recorded. Upon recording or reproduction of the layer-1 (L1) 19, therefore, a stable recording or reproduction in which the intensity of the laser beam does not fluctuate can be performed since the transmittance of the layer-0 (L0) 18 does not substantially change irrespective of whether the data signal has been recorded on the layer-0 (L0) 18 (i.e., an upper layer) or not.

The order in the foregoing processing routine can be modified so as to execute the initialization of the layer-0 (L0) 18 with the dummy signal (step S14) before the initialization of the layer-1 (L1) 19 with the non-modulation signal (step S12). It is sufficient that the calculation (step S13) of the modulation frequency (f) of the dummy signal and the driving current value (or duty ratio) of the laser light source 22 is executed prior to the initialization of the layer-0 (L0) 18 with the dummy signal. For example, the values may be previously calculated before the start of the initializing routine.

Second Embodiment

Figure 4:
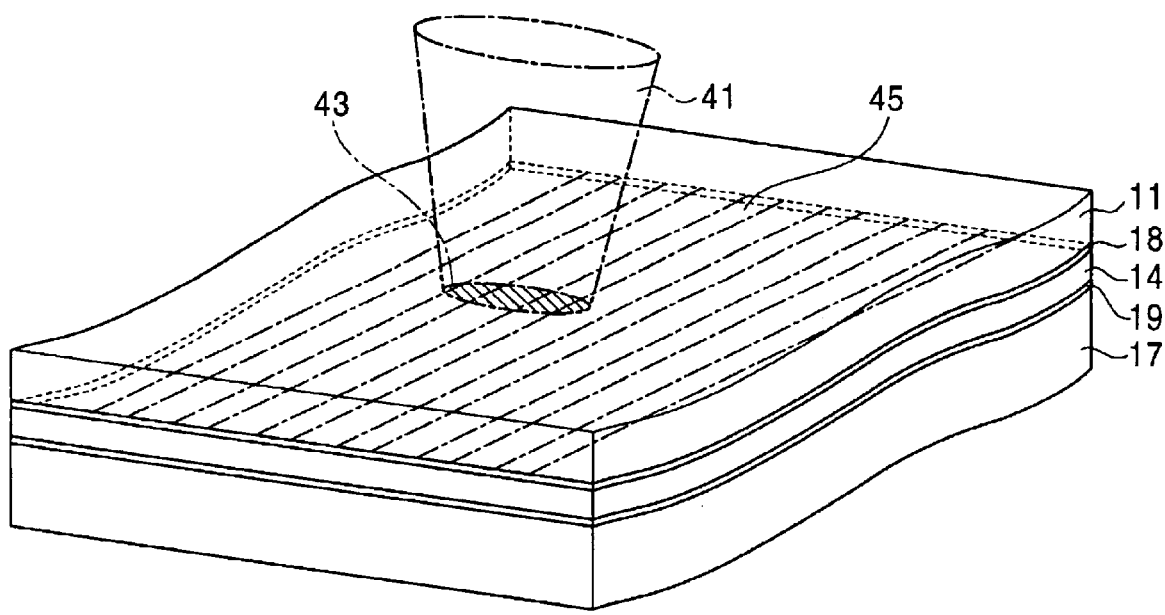
FIG. 4 is a diagram showing a laser beam and a beam spot on a recording layer when using a recording apparatus of a multilayer recording disc according to the second embodiment of the present invention.

Recording apparatus and method of a multilayer recording disc according to the second embodiment of the present invention will now be described hereinbelow with reference to FIG. 4.

In the embodiment, the optical pickup 21 has an optical system (not shown) for emitting an elliptic laser beam 41. More particularly, a beam spot 43 which is formed by irradiating the laser beam 41 on the recording layer has an elliptic shape whose major axis is in the direction that is approximately perpendicular to tracks of the multilayer recording disc 10 and which is located over a plurality of tracks of the multilayer recording disc 10. A plurality of tracks 45, therefore, can be simultaneously initialized by the laser beam 41. A time that is required for the initialization can be remarkably reduced by using an elliptic shape laser beam.

Although the example of the 2-layer optical disc has been described in the above embodiment, the present invention can be also similarly applied to an optical disc having a plurality of phase change recording films.

The initialization by the dummy signal or the non-modulation signal does not need to be performed over the whole surface of the optical disc but may be executed with respect to only a part of the disc.

As dummy information for generating the dummy signal, information which does not have any meaning by itself, for example, random data or a pulse train of a predetermined period can be used. For an image/audio data, a picture of a monochromatic color, audio data of a predetermined frequency, or the like can be used. When a dummy data having a meaning by itself is used, the data should be obviously distinguished from information data to be recorded, for example, an image or audio data which indicates that the data is dummy.

As will be obviously understood from the above description, according to the present invention, there is provide a multilayer optical recording medium on which stable recording can be performed and a recording method and an apparatus of the multilayer optical recording medium.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on a Japanese Patent Application No. 2000-152272 which is hereby incorporated by reference.

What is claimed is:

1. A multilayer recording medium comprising:
a rewritable multilayer recording medium in which a light beam is transmitted through one recording layer and at the same time said light beam is irradiated to another recording layer, thereby recording a data signal, wherein a dummy signal is recorded on said one recording layer prior to recording of the data signal on said another recording layer
wherein a frequency f of said dummy signal satisfies;

$$f \geq v \times n / (2 \times NA \times d)$$

where,
d (mm): interval between said one recording layer and said another recording layer
NA: numerical aperture of an objective lens for converging said light beam
n: refractive index of a medium between said one recording layer and said another recording layer
v (mm/sec): line velocity of said multilayer recording medium when recording said dummy signal.

2. A multilayer recording medium according to claim 1, wherein said dummy signal has a pulse train such that a transmittance of said one recording layer after said dummy signal is recorded is approximately identical to a transmittance after a predetermined data signal is recorded to said one recording layer.

3. A recording apparatus of a rewritable multilayer recording medium in which a light beam is transmitted through one recording layer and at the same time said light beam is irradiated to another recording layer, thereby recording a data signal, comprising:

a recording unit for recording a dummy signal on said one recording layer prior to recording of the data signal on said another recording layer;

wherein said recording unit includes a dummy-signal generating unit for generating said dummy signal and a frequency f of said dummy signal satisfies;

$$f \geq v \times n/(2 \times NA \times d)$$

where,
- d (mm): interval between said one recording layer and said another recording layer
- NA: numerical aperture of an objective lens for converging said light beam
- n: refractive index of a medium between said one recording layer and said another recording layer
- v (mm/sec): line velocity of said multilayer recording medium when recording said dummy signal.

4. An apparatus according to claim 3, wherein said dummy signal has a pulse train such that a transmittance of said one recording layer after said dummy signal is recorded is approximately identical to a transmittance after a predetermined data signal is recorded to said one recording layer.

5. A recording apparatus of a rewritable multilayer recording medium in which a light beam is transmitted through one recording layer and at the same time said light beam is irradiated to another recording layer, thereby recording a data signal, comprising:

a recording unit for recording a dummy signal on said one recording layer prior to recording of the data signal on said another recording layer;

wherein said light beam has an elliptic beam spot whose major axis is located in a direction that is approximately perpendicular to tracks on said multilayer recording medium and said beam spot is located over a plurality of tracks of said multilayer recording medium.

6. A recording method of a rewritable multilayer recording medium, in which a light beam is transmitted through one recording layer and at the same time said light beam is irradiated to another recording layer, thereby recording a data signal, comprising:

a first initializing step of initializing said another recording layer based on a first initializing condition; and a second initializing step of initializing said one recording layer based on a second initializing condition different from said first initializing condition, wherein:

a dummy signal is recorded on said one recording layer; and a frequency f of said dummy signal satisfies $$f \geq v \times n/(2 \times NA \times d)$$

where,
- d (mm): interval between said one recording layer and said another recording layer
- NA: numerical aperture of an objective lens for converging said light beam
- n: refractive index of a medium between said one recording layer and said another recording layer
- v (mm/sec): line velocity of said multilayer recording medium when recording said dummy signal.

* * * * *